(12) United States Patent
Nakayama (10) Patent No.: US 7,622,015 B2
(45) Date of Patent: Nov. 24, 2009

(54) STACKED OPTICAL FILM PACKAGE FORMAT

(75) Inventor: Naoki Nakayama, Tendo (JP)

(73) Assignee: 3M Innovative Properties Company, St. Paul, MN (US)

( * ) Notice: Subject to any disclaimer, the term of this patent is extended or adjusted under 35 U.S.C. 154(b) by 319 days.

(21) Appl. No.: 11/276,686

(22) Filed: Mar. 10, 2006

(65) Prior Publication Data

US 2007/0209756 A1  Sep. 13, 2007

(51) Int. Cl.
*B32B 37/00* (2006.01)

(52) U.S. Cl. .................... 156/272.2; 428/1.1

(58) Field of Classification Search .......... 156/272.2, 156/344; 428/1.1
See application file for complete search history.

(56) References Cited

U.S. PATENT DOCUMENTS

| | | | | |
|---|---|---|---|---|
| 4,968,558 A * | 11/1990 | Fisher et al. | ................ | 428/345 |
| 5,187,007 A * | 2/1993 | Ebe et al. | ................ | 428/343 |
| 5,269,868 A * | 12/1993 | Gofuku et al. | ................ | 156/344 |
| 5,976,955 A * | 11/1999 | Hodges | ................ | 438/464 |
| 6,160,663 A * | 12/2000 | Merrill et al. | ................ | 359/500 |
| 6,208,397 B1 * | 3/2001 | Shimodaira et al. | ......... | 349/122 |
| 7,224,416 B2 * | 5/2007 | Cha et al. | ................ | 349/60 |
| 2004/0228141 A1 * | 11/2004 | Hay et al. | ................ | 362/555 |
| 2005/0003108 A1 | 1/2005 | Sumida et al. | | |
| 2005/0046767 A1 * | 3/2005 | Freking et al. | ................ | 349/62 |

FOREIGN PATENT DOCUMENTS

| | | | |
|---|---|---|---|
| JP | 2000-73027 | | 3/2000 |
| JP | 2000073027 A | * | 3/2000 |
| JP | 2003-207767 | | 7/2003 |
| WO | WO 2005/024473 | | 3/2005 |

OTHER PUBLICATIONS

Machine Translation of JP 2000073027 A.*

* cited by examiner

*Primary Examiner*—John L Goff
*Assistant Examiner*—Daniel McNally
(74) *Attorney, Agent, or Firm*—Carolyn A. Fischer (57) ABSTRACT

An optical subassembly is described comprising a stack of at least two optical films bonded with an adhesive having a relatively high initial peel strength. The peel strength is capable of being reduced upon exposure to radiant energy. Method of making an optical subassembly and display are also described. The backlight of the display may provide the radiant energy that reduces the peel strength of the adhesive.

19 Claims, 5 Drawing Sheets

Fig. 4a

STACKED OPTICAL FILM PACKAGE FORMAT

BACKGROUND

The present invention is related to optical displays. In particular, the present invention relates to pre-stacked optical films for assembly into an optical display.

Optical displays, such as backlit liquid crystal displays (LCDs), are used in a wide variety of applications including mobile telephones, personal digital assistants (PDAs), electronic games, laptop computers, monitors, and television screens. Optical films are stacked within an optical display in order to enhance brightness and improve display performance without sacrificing battery life.

Optical films used in displays can be provided as individual films to display manufacturers.

WO 2005/024473 describes a stack of two or more optical films held together before insertion into a display. The optical films can be adhered together using adhesive positioned outside the viewing area of the films. In some embodiments, the adhesive is provided at one or more tabs provided at the periphery of the film stack.

BRIEF SUMMARY OF THE INVENTION

It has been discovered that during the normal course of using an optical display, the stacked films can become warped. Individual optical films within the stack are often made of different materials having different thermal expansion properties. Upon exposure to the backlight of the display, individual films with the stack are surmised to expand at different rates. Since the films within the stack cannot move relative to each other, because of being adhered to each other by the adhesive layer, warping occurs.

In one embodiment, a method of making an optical subassembly is described. The method comprises applying an adhesive to a first optical film, and contacting a second optical film with the adhesive thereby forming a stack of optical films having an initial peel strength and exposing the adhesive to radiant energy thereby reducing the initial peel strength such that the first and second optical films can move independently relative to each other.

In another embodiment, a method of assembling an optical display is described comprising providing a stack of optical films between a backlight and a display panel. The stack comprises at least two optical films bonded with an adhesive having an initial peel strength. The method further comprises exposing the adhesive to radiant energy thereby reducing the initial peel strength such that the first and second optical films can move independently relative to each other.

Exposing the adhesive to radiant energy can occur prior to or after the stack in provided in the display. The backlight of the display may be the source of radiant energy.

In another embodiment, an optical subassembly is described comprising a stack comprising at least a first and second optical film bonded with an adhesive having an initial peel strength; wherein the initial peel strength is capable of being reduced upon exposure to radiant energy.

DETAILED DESCRIPTION OF PREFERRED EMBODIMENTS

It has been discovered that one way to reduce warp is by reducing the bond strength (e.g. peel strength) of the adhesive that bonds the optical films of the stack. Reducing bond strength is also amenable to allowing optical films that have been misaligned relative to each other due to positioning inaccuracies of robotic devices used to stack the films to correct their position.

In one embodiment, an optical film stack is assembled using an adhesive that initially permanently bonds the optical films of the stack to each other such that the individual films within the stack do not move relative to each other. The film stack can then be safely delivered to an optical display manufacturer. The bond strength of the adhesive is then reduced, for example by exposing the adhesive to a radiant energy source, such that individual films within the stack can move independently. The bond strength of the adhesive can be reduced prior to or after installation of the optical film stack into an optical display.

Initially, the optical films are typically permanently bonded together. In preferred embodiments, the initial bond exhibits a high peel strength as measured using an I-mass tester (Instrumentors Inc., located in Strongsville, Ohio) at a 180° peel angle and at a speed of 300 mm/minute. The amount of force typically needed to separate the bonded optical films may be about 20,000 mN/25 mm or even higher depending on the strength of the optical films. A permanent bond can be achieved with a lower initial peel strength. For example the peel strength may be less than 15,000 mN/25 mm, less than 10,000 mN/25 mm, or less than 5,000 mN/25 mm. The initial peel force is typically greater than about 2,000 mN/25 mm.

Exhibiting a sufficiently high initial peel strength ensures that the optical film stack can be delivered to and stored by an optical display manufacturer without the films being able to move relative to each or becoming delaminated. High peel strength bonds can be provided with various adhesive as are known in the art such as certain permanent grade pressure sensitive adhesive and various curable adhesives such as radiation curable adhesive. Radiation curable adhesives comprise ethylenically unsaturated ingredients such as (meth) acrylate monomer(s), oligomer(s), polymer(s), and combinations thereof, that crosslink upon exposure to ultraviolet radiation, visible radiation, electron beam radiation, and combinations.

The amount of peel force that allows for movement of individual films relative to each other can vary depending on the internal strength of the optical films being bonded in the stack. It is surmised that the peel force is typically less than about 2,000 mN/25 mm (e.g. less than 1,800 mN/25 mm, less than 1,600 mN/25 mm, less than 1,400 mN/25 mm, or less than 1,200 mN/25 mm). In some embodiments, the peel force no greater than 1,000 mN/25 mm (e.g. less than 800 mN/25 mm, less than 600 mN/25 mm) and may be less than 500 mN/25 mm (e.g. less than 400 mN/25 mm) or even less than 200 mN/25 mm.

In another embodiment, an optical subassembly is described that comprises a stack of at least two optical films bonded with an adhesive having a (e.g. high) initial peel strength, wherein the initial peel strength is capable of being reduced for example by exposure to radiant energy. In this embodiment, the initial peel strength typically does not allow independent movement of the films within the stack. In one embodiment, the peel strength is reduced to about 25 mN/25 mm to about 2,000 mN/25 mm after exposure to radiant energy such as light.

In one aspect, the adhesive of the optical film stack is exposed to radiant energy, such as light, prior to installation into an optical display. In another embodiment, the optical film stack is installed into the optical display of a device and the adhesive is exposed to the light source within the optical display. This could occur at the location of manufacture of the display or after the display has been provided to the end user that utilizes the device. After the adhesive receives the appropriate amount of light by either or both methods, the bond strength between the adhered optical films is reduced to allow for independent movement of the optical films.

When the optical stack is exposed to radiant prior to installing the stack into a display, any radiant energy source can be used provided that the radiant energy exposure does not detract from the performance of the components (e.g. optical films) of the stack.

When the backlight of the optical display is the light source that causes the reduction in peel strength, the adhesive composition will be selected based on the backlight (or vice-versa). The light source of an (e.g. LCD) display is typically a cold cathode fluorescent light source or a mercury lamp having filters.

Typically, the peel force gradually decreases over a relatively short period. Preferably, the target decrease is accomplished in no more than about 24 hours. The time period may be as short a few (i.e. 2-3) seconds (e.g. with e-beam exposure) a few minutes, or even a few hours. However, it some instances it may be suitable for this decrease to occur over a time period of 1 week, 2 weeks, or even 1 month.

In one embodiment, the amount and intensity of light needed to reduce the peel strength to the target level, is about 200 lux to about 400 lux over a period of about 1 hour to about 24 hours.

A photocurable adhesive can be employed in combination with a fluorescent backlight. The reduced peel strength occurs after exposure to light that includes wavelengths of about 300 nm to about 400 nm.

In one embodiment, the adhesive is a (e.g. photocurable) pressure sensitive tape. Alternatively however, the adhesive could be a water-based adhesive, a solvent-based adhesive, a (e.g. low application temperature) hot melt adhesive, or a polymerizable liquid adhesive composition. The thickness of adhesive layer typically ranges from about 10 micrometers and about 50 micrometers.

Various types of optical films in a variety of arrangements may be employed in the method and articles. Optical films include for example light directing films, turning films, multi-layer polymer films, diffuser-type films, reflective films, (e.g. reflective, absorptive) polarizers, light guides, or brightness enhancing films. For example, the various stacks described in U.S. Patent Application Publication No. 2005/0046767, published Mar. 3, 2005; incorporated herein by reference, can be prepared from the method described herein.

Figure 1:
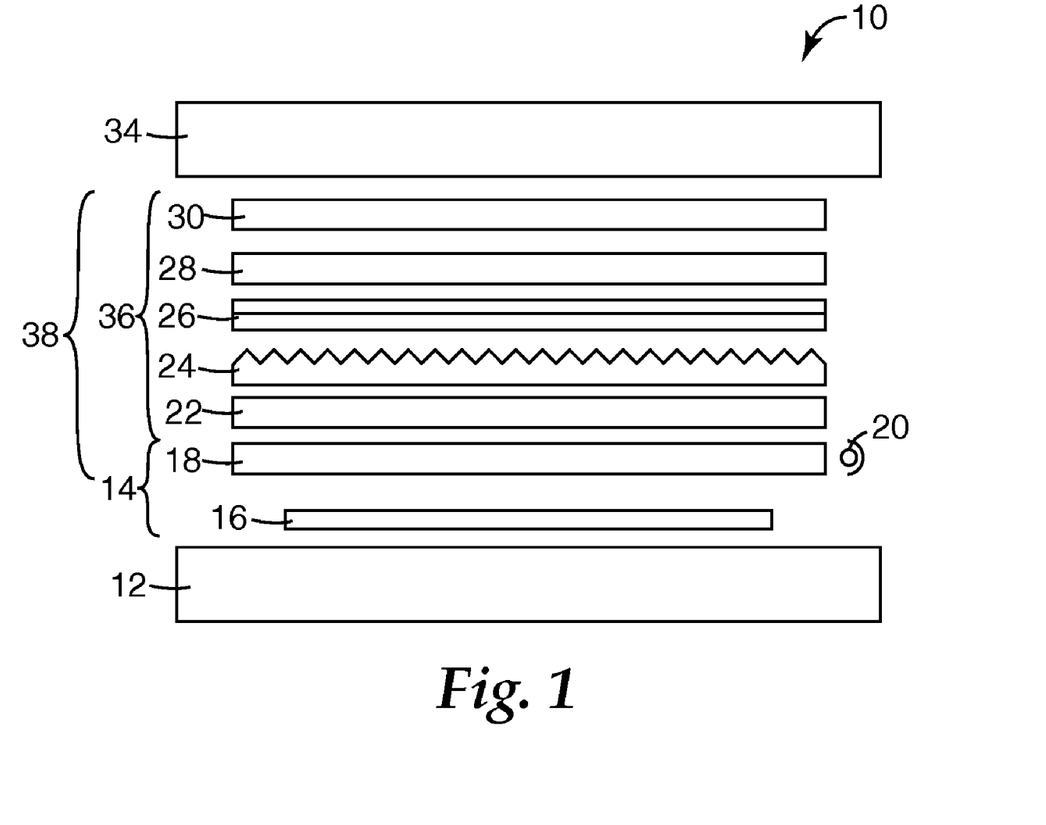
FIG. 1 is an exploded view of a representative embodiment of an optical display.

FIG. 1 shows a schematic diagram of optical display 10 that is not drawn to scale. Optical display 10 includes chassis 12, backlight unit 14 with reflector 16, light guide 18 and light source 20, diffuser 22, prismatic films 24 and 26, diffuser 28, reflective polarizer 30, display panel 34, optical film unit 36 (formed by elements 22-30) and optical film package 38 (formed by optical film unit 36 and light guide 18).

Chassis 12 is typically a plastic frame for supporting components of optical display 10. In this embodiment, backlight unit 14 includes one or more layers of reflector 16, along with light guide 18, and light source 20. Light guide 18 may include special features for directing light and can take the form of a slab as shown or other forms such as a wedge. In other embodiments, backlight unit 14 and light guide 18 may have alternate forms.

Light source 20 may be any suitable (internal or external) type of light source such as a fluorescent lamp, light emitting diodes, or direct lit. Light from light source 20 is directed toward display panel 34 via light guide 18. In one embodiment, light source 20 is fluorescent lamp FPL27EX-N made by Matsushita Electric out of Japan includes light at an intensity of about 200 lux to about 400 lux and at a wavelength of about 300 nanometers (nm) to about 400 nm.

Next, diffuser 22 is stacked onto light guide 18. Diffuser 22 homogenizes the intensity of the light from light guide 18.

Prismatic films 24 and 26 are stacked onto diffuser 22. Films 24 and 26 contain arrays of prisms for directing light toward display panel 34. Relative to each other, films 24 and 26 may be arranged such that their prism arrays run parallel, or more typically, the prism arrays run non-parallel. As shown in this embodiment, the prism arrays run perpendicular relative to each other.

Diffuser 28 is stacked onto prismatic film 26. Diffuser 28 is typically a relatively weak diffuser and, as described in regard to diffuser 22, homogenizes the light intensity so that it is more uniform.

The last film shown stacked is reflective polarizer 30. Reflective polarizer 30 may be any number of types of reflective polarizers including a multi-polymer film, a cholesteric polarizer, or a wire-grid polarizer. Reflective polarizer 30 recycles light that is in the wrong polarization state and will not be transmitted as image light.

Typically, reflective polarizer 30 is laminated to the back of panel 34. However, as in the case shown here and in the following embodiments, reflective polarizer 30 may be stacked with the other layers.

It should be noted that layers 22-30 represent one embodiment. Depending on needs and desires, some of layers 22-30 may be omitted, added to, or substituted. For example, a turning film with its prisms facing either up or down, flat or crossed, may replace prismatic films 24 and 26, or a reflective polarizer with prisms may be added. Also shown in this embodiment, each layer is relatively the same size. In other embodiments, each layer may have a different size relative to other layers.

Layers 22-30 form optical film unit 36. The addition of light guide 18 forms optical film package 38. Optical film unit 36 and optical film package 38 may be referred to as optical subassemblies. Unit 36 and package 38 are assembled prior to delivery to a manufacturer for assembly of optical display 10. In one embodiment, light guide 18 and reflector 16 may be included in the film stack. Also, display 10 may include a plurality of film stacks. In one embodiment, for example, one stack could be reflector 16, light guide 18 and diffuser 28 and another, for example, may be an optical film and reflective polarizer 30.

Figure 2A:
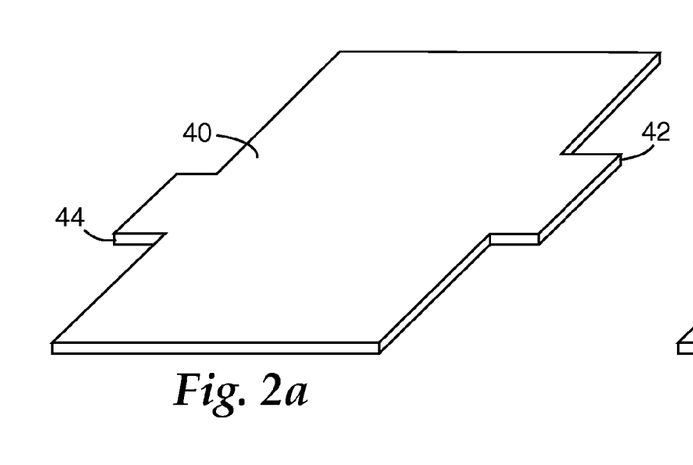
FIGS. 2a-2d are perspective views of an optical film unit with an adhesive layer.

FIGS. 2a-2d are perspective views illustrating assembly of an optical film unit with an adhesive layer. FIG. 2a depicts an optical film 40, which is shown with tabs 42 and 44, sometimes used to align a plurality of optical films during assembly. In other embodiments, optical film 40 may not have any tabs. In one embodiment, optical film 40 is a brightness enhancement film. In other embodiments, various other optical films as known in the art may be used.

Figures 2B, 2D:
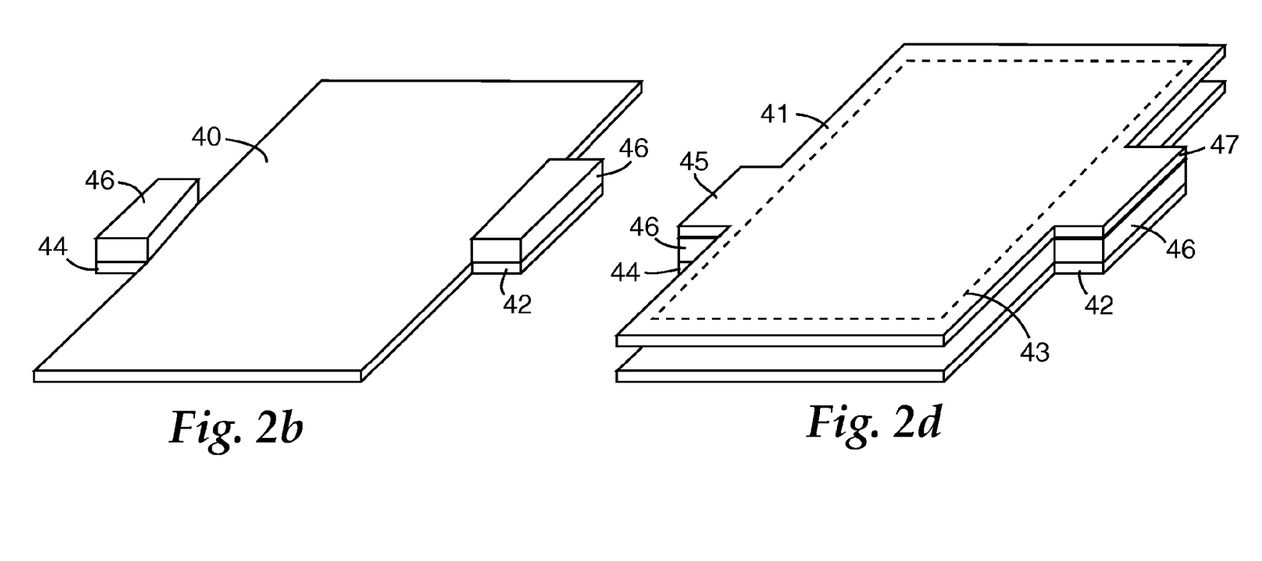

FIG. 2b illustrates optical film 40 with an adhesive layer 46 laminated onto tabs 42 and 44 of optical film 40. Lamination of adhesive layer 46 onto optical film 40 can be performed using an automated assembly line or by an operator that individually applies adhesive layer 46 to optical film 40. Adhesive layer 46 can be used to adhere multiple optical film units together in order to increase efficiency by not having to arrange these layers one by one.

As illustrated in FIG. 2b, adhesive layer 46 is shown as two adhesive tabs, which extend to the perimeter of optical film 40 and only cover tabs 42 and 44 of optical film 40.

Figure 2C:
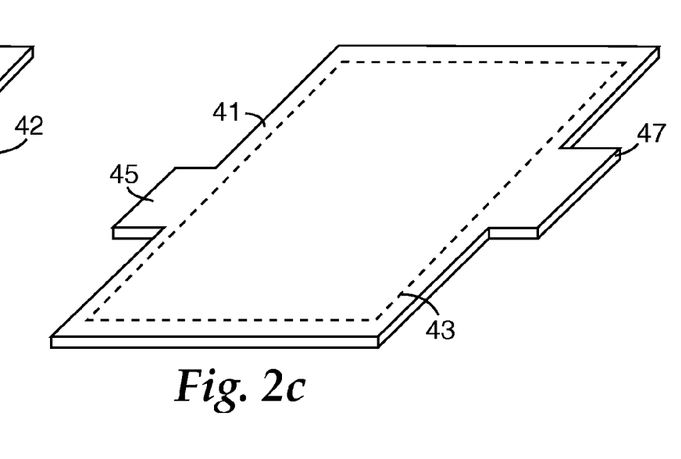

FIG. 2c illustrates optical film 41 that is laminated onto adhesive layer 46. Optical film 41 can be the same type of film as optical film 40, or it can be a different type of film. Dotted lines 43 in FIG. 2c signify outer edges of the LCD viewing area. The area outlined by dotted lines 43 is typically free of adhesive, particularly adhesives that would obstruct the viewing area. Therefore, the adhesive layer is usually provided in the area from the dotted lines out to the perimeter of film 41. Film 41 is also shown with tabs 45 and 47.

FIG. 2d illustrates optical film 41 laminated on top of adhesive layer 46. Although FIG. 2d illustrates only two optical films, there is no limit as to the number of films that may be stacked, and the number of optical films may vary depending on the type of optical display in which they are used. In addition, some or all of the optical films may be of the same type or different, again, depending on the optical display.

FIGS. 3a-3i, and any combinations thereof, illustrate various embodiments for placement of an adhesive layer. The adhesive layer can be placed on one or more tabs and/or have various shapes and sizes.

Figures 3A, 3C:
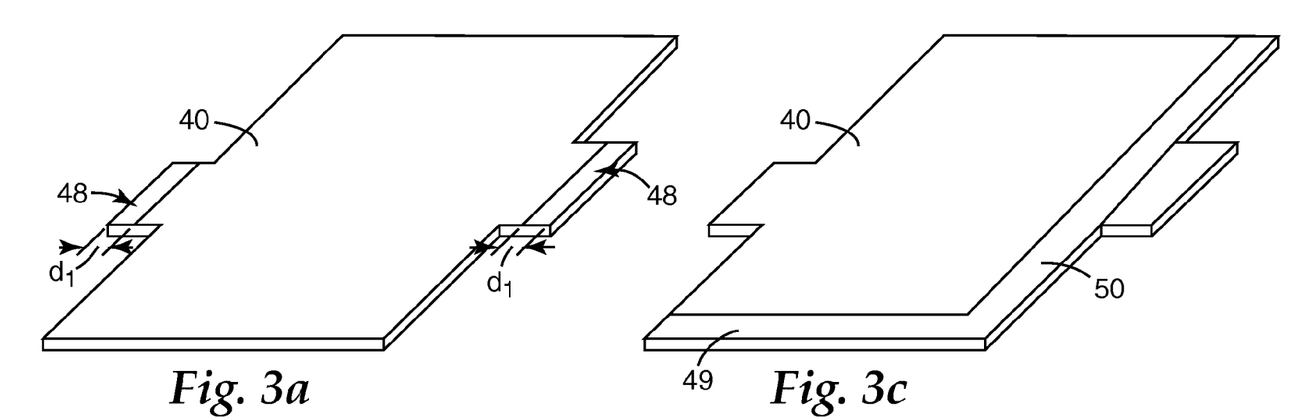
FIGS. 3a-3i are perspective views of various embodiments for the adhesive layer.

For example, FIG. 3a illustrates optical film 40 with the adhesive layer shown as one or more adhesive layers 48, which do not cover an entire tab, illustrated as covering distance d1.

Figures 3B, 3D:
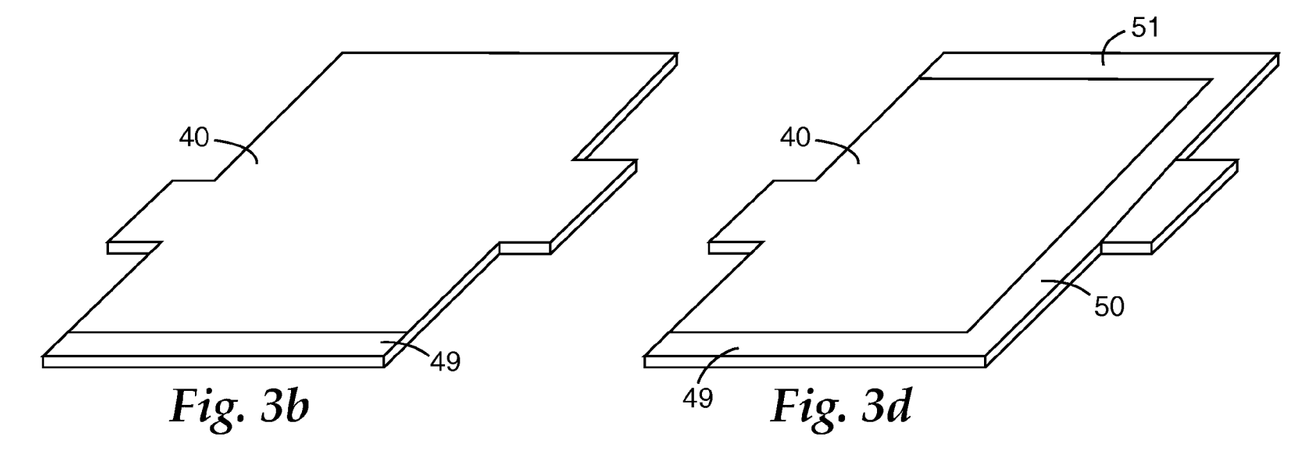

FIG. 3b illustrates optical film 40 with the adhesive layer shown as strip 49 along one edge of optical film 40.

FIG. 3c illustrates optical film 40 with the adhesive layer shown as strips 49 and 50 along two edges of optical film 40.

FIG. 3d illustrates optical film 40 with the adhesive layer shown as strips 49, 50 and 51 along three edges of optical film 40

Figure 3E:
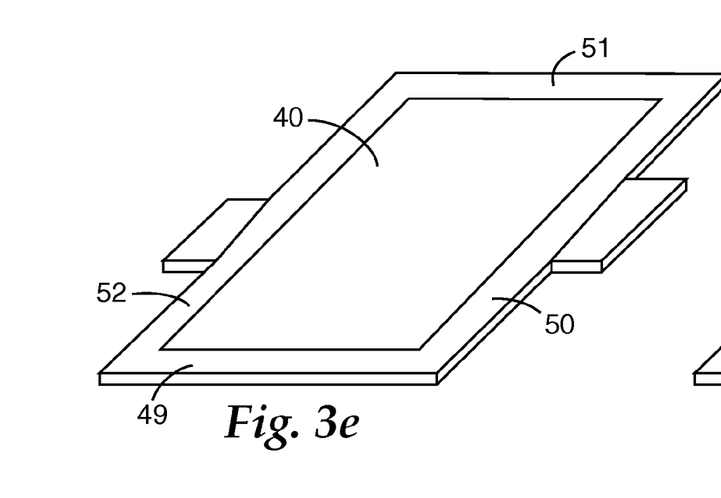

FIG. 3e illustrates optical film 40 with the adhesive layer shown as strips 49, 50, 51 and 52 along all four edges of optical film 40.

Figure 3F:
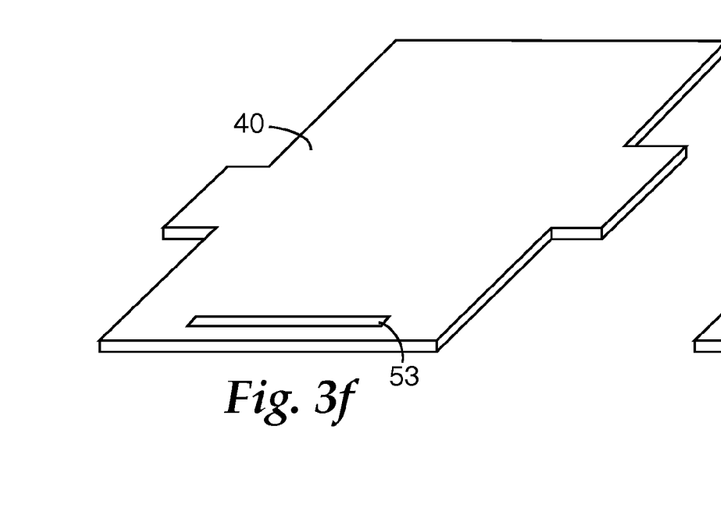

FIG. 3f illustrates optical film 40 with the adhesive layer shown as recessed strip 53 along one edge of optical film 40. Recessed strip defined as a strip that is recessed from the perimeter of optical film 40.

Figure 3G:
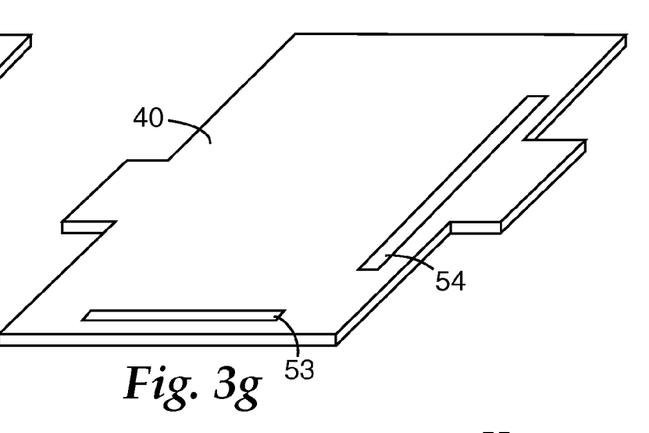

FIG. 3g illustrates optical film 40 with the adhesive layer shown as recessed strips 53 and 54 along two edges of optical film 40.

Figure 3H:
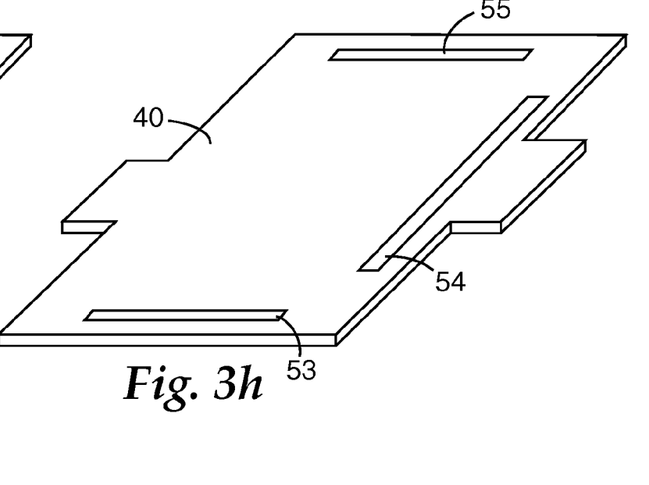

FIG. 3h illustrates optical film 40 with the adhesive layer shown as recessed strips 53, 54 and 55 along three edges of optical film 40.

Figure 3I:
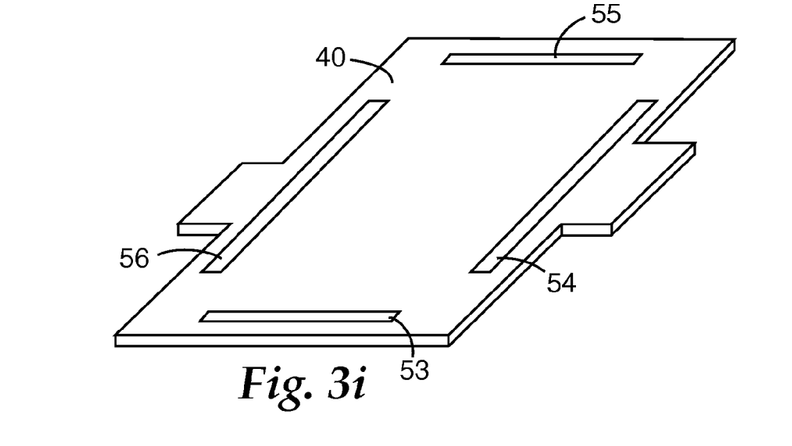

FIG. 3i illustrates optical film 40 with the adhesive layer shown as recessed strips 53, 54, 55, and 56 along all four edges of optical film 40.

Figure 4A:
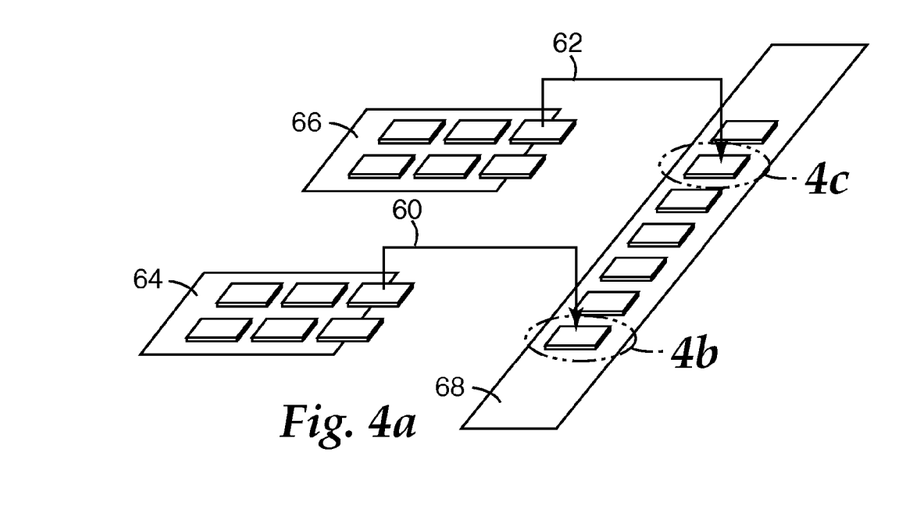
FIGS. 4a-4c are perspective views illustrating a method of making optical film units in accordance with the present invention.
Figure 4B:
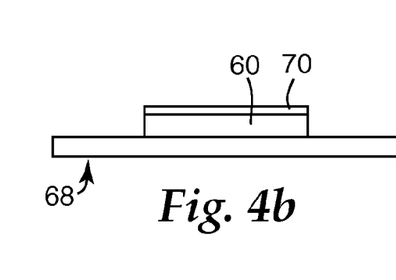
Figure 4C:
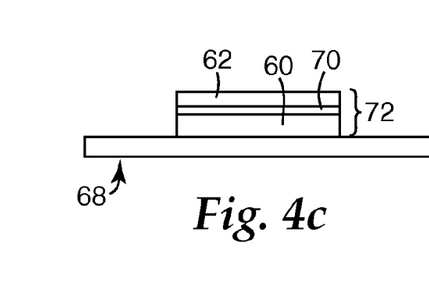

FIGS. 4a-4c illustrate steps of a representative embodiment of a method of making the present invention. In FIG. 4a, optical films 60 and 62 are shown attached to liners 64 and 66, respectively. Initially, a third and fourth liner (not shown) also covered films 60 and 62 on liners 64 and 66, respectively. The third and fourth liners were removed just prior to the stage of the method illustrated in FIGS. 4a-4c.

Next, optical film 60 is removed from liner 64. Optical film 60 is then placed on liner 68 either manually with a gloved hand or by a robotic arm. In FIG. 4b, an exploded side view of film 60 is shown. Adhesive layer 70 is then laminated onto optical film 60. In the embodiment illustrated in FIG. 4b, adhesive layer 70 is a strip along all four edges of optical film 60 and is about 10 micrometers to about 50 micrometers thick.

FIG. 4a also shows optical film 62 being removed from liner 66. FIG. 4c then shows film 62 placed onto adhesive layer 70 to form optical stack 72. Other materials, as referenced and explained in FIG. 1, may be added to optical stack 72 before being placed in an optical assembly.

A variety of combination of adhesives may be utilized within the stack. For example, the stack may include any number (e.g. two to all) of optical films bonded with a low peel strength adhesive as described herein; and/or any number of optical films bonded with an adhesive that is exposed to radiant energy to reduce the peel strength as described herein. Further the stack may also comprise other optical films bonded with other adhesives that maintain a high peel strength.

EXAMPLE

Two samples, each sample having a first sheet of ThinBEF film (available from 3M Company) laminated to a second sheet of Thin BEF with a 25 µm thick UV curable dry tape (commercially available from Emulsion Technology Co. Ltd. under the trade designation "E-TEC") were tested. For testing purposes, substantially the entire surfaces of the films were in contact with the adhesive.

The film stack and adhesive were exposed to a FPL27EX-N fluorescent lamp (Matsushita Electric of Japan) having a brightness of 280 lux for 72 hours, and the peel strength was tested periodically. The primary emission wavelengths of the fluorescent lamp were in the visible spectrum, while the 300 nm to 400 nm emission needed to cure the adhesive was only a minor component of the spectrum of light.

Peel strength, measured in milliNewtons/25 millimeters (mN/25 mm), was determined using an I-mass tester (Instrumentors Inc., located in Strongsville, Ohio) at a 180° peel angle and at a speed of 300 mm/minute. The results are shown in Table 1.

TABLE 1

| | Exposure time (hrs) | | | |
| --- | --- | --- | --- | --- |
| | 0 | 24 | 48 | 72 |
| Peel strength (mN/25 mm) | 17199.0 | 284.2 | 102.9 | 102.9 |

The results show that after about 24 hours of exposure, the peel strength of the adhesive was reduced.

Although the present invention has been described with reference to preferred embodiments, workers skilled in the art will recognize that changes may be made in form and detail without departing from the spirit and scope of the invention.

The invention claimed is:

1. A method of assembling an optical display providing a stack of optical films; wherein the stack comprises at least a first and second optical film bonded with an adhesive having an initial peel strength;

exposing the adhesive to radiant energy thereby reducing the initial peel strength such that the first and second optical films are bonded with the adhesive prior to exposure and the first and second optical films can move independently relative to each other within the stack after exposure; and providing the bonded stack of optical films between a backlight and a display.

2. The method of claim 1, wherein the initial peel strength is at least 50% greater than the reduced peel strength.

3. The method of claim 1, wherein the peel strength after exposure to light is less than 1,000 milliNewtons/25 millimeters.

4. The method of claim 1, wherein the radiant energy is fluorescent light.

5. The method of claim 1, wherein the adhesive layer is provided on perimeter portions of the optical films.

6. The method of claim 1, wherein the adhesive is a tape, an ethylenically unsaturated polymerizable adhesive, or combination thereof.

7. The method of claim 1, wherein the adhesive has a thickness ranging from about 10 micrometers to about 50 micrometers.

8. The method of claim 1, wherein the optical films are selected from light directing films, turning films, multi-layer polymer films, diffuser-type films, reflective films, polarizers, light guides, brightness enhancing films, and combination thereof.

9. The method of claim 1 wherein the initial peel strength is greater than 5,000 milliNewtons/25 millimeters.

10. The method of claim 1 wherein the peel strength after exposure to radiant energy is less than 2,000 milliNewtons/25 millimeters.

11. The method of claim 1 wherein the peel strength after exposure to radiant energy is at least 25 milliNewtons/25 millimeters.

12. A method of assembling an optical display providing a stack of optical films; wherein the stack comprises at least a first and second optical film bonded with an adhesive having an initial peel strength;

exposing the adhesive to radiant energy after the stack of optical films is provided between a backlight and a display panel thereby reducing the initial peel strength such that the first and second optical films can move independently relative to each other.

13. The method of claim 12 wherein the backlight of the display provides the radiant energy.

14. The method of claim 13, wherein radiant energy emitted from the backlight has an intensity range of about 200 lux to about 400 lux and at a wavelength of about 300 nanometers to about 400 nanometers.

15. The method of claim 13 wherein the initial peel strength is reduced over a period of time ranging from about 1 hour to about 24 hours.

16. The method of claim 12 wherein the initial peel strength is greater than 5,000 milliNewtons/25 millimeters.

17. The method of claim 12 wherein the peel strength after exposure to radiant energy is less than 2,000 milliNewtons/25 millimeters.

18. The method of claim 12 wherein the peel strength after exposure to radiant energy is at least 25 milliNewtons/25 millimeters.

19. The method of claim 12, wherein the optical films are selected from light directing films, turning films, multi-layer polymer films, diffuser-type films, reflective films, polarizers, light guides, brightness enhancing films, and combination thereof.

* * * * *

UNITED STATES PATENT AND TRADEMARK OFFICE
CERTIFICATE OF CORRECTION

PATENT NO.        : 7,622,015 B2                                         Page 1 of 1
APPLICATION NO.   : 11/276686
DATED             : November 24, 2009
INVENTOR(S)       : Naoki Nakayama It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 578 days.

Signed and Sealed this

Twenty-sixth Day of October, 2010

David J. Kappos
*Director of the United States Patent and Trademark Office*